US010965834B2

(12) United States Patent
Yoshioka

(10) Patent No.: US 10,965,834 B2
(45) Date of Patent: Mar. 30, 2021

(54) INFORMATION PROCESSING APPARATUS EQUIPPED WITH FUNCTION OF ADDING NEW CONTENT TO ORIGINAL FILE AND OUTPUTTING FILE

(71) Applicant: KYOCERA Document Solutions Inc., Osaka (JP)

(72) Inventor: Yoshiki Yoshioka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/576,397

(22) Filed: Sep. 19, 2019

(65) Prior Publication Data
US 2020/0092439 A1    Mar. 19, 2020

(30) Foreign Application Priority Data
Sep. 19, 2018   (JP) .............................. JP2018-174761

(51) Int. Cl.
*G06K 15/00* (2006.01)
*H04N 1/387* (2006.01)
*H04N 1/32* (2006.01)

(52) U.S. Cl.
CPC ....... *H04N 1/3871* (2013.01); *H04N 1/32112* (2013.01); *H04N 2201/0094* (2013.01)

(58) Field of Classification Search
CPC .. H04N 1/3871; H04N 1/3876; H04N 1/3872; H04N 1/32112; H04N 2201/0094
See application file for complete search history.

(56) References Cited

U.S. PATENT DOCUMENTS

| 2004/0139326 A1* | 7/2004 | Ootsuka ................ G06F 21/606 713/176 |
| 2006/0294452 A1* | 12/2006 | Matsumoto ........... G06F 40/103 715/236 |
| 2010/0188687 A1* | 7/2010 | Fukano .............. G06K 15/1806 358/1.15 |

(Continued)

FOREIGN PATENT DOCUMENTS

| JP | H07-134766 A | 5/1995 |
| JP | H10-016343 A | 1/1998 |

*Primary Examiner* — Moustapha Diaby
(74) *Attorney, Agent, or Firm* — Hawaii Patent Services; Nathaniel K. Fedde; Kenton N. Fedde

(57) ABSTRACT

Provided is an information processing apparatus capable of combining the addition of a plurality of items in an original file in various forms, and outputting the file. A storage unit correlates additional content identification information for identifying additional content that is content added to the original file or content after change; additional content manager information for identifying a manager of the additional content; and add location identification information for identifying a location where the additional content is to be provided in the original file with the additional content and stores the information. A control unit provides the additional content that is extracted from a file other than the original file based on the additional content identification information, or that is acquired from the manager based on the additional content manager information to the original file based on the add location identification information, and causes the file to be outputted as the output target file.

2 Claims, 4 Drawing Sheets

(56) References Cited

U.S. PATENT DOCUMENTS

2014/0164055 A1* 6/2014 Knight ............... G06Q 30/0201
                                                            705/7.29
2017/0214829 A1* 7/2017 Nakabayashi ..... H04N 1/32144
2017/0344563 A1* 11/2017 Kamath ............. G06F 3/04842

* cited by examiner

AAAAAAAAAAAAAAAA

BBBBBBBBBBBBBBBBB

CCCCCCCCCCCCCCCCC

DDDDDDDDDDDDDDDDD

|   | ITEM 1 | ITEM 2 | ITEM 3 |
|---|--------|--------|--------|
| A | A1 | A2 | A3 |
| B | B111111 | B222222 | B333333 |
| C | C111111 | C222222 | C333333 |

EEEEEEEEEEEEEEEEE

FFFFFFFFFFFFFFFFFF

FIG.2

(1) ADDITIONAL CONTENT MANAGER INFORMATION
E-MAIL ADDRESS AND THE LIKE (2) ADDITIONAL CONTENT IDENTIFICATION INFORMATION (2-1) FOLDER SPECIFICATION (2-2a) FILE NAME (2-2b) FILE EXTENSION (2-3a) LOCATION WHERE ADDITIONAL INFORMATION IS PROVIDED (2-3b) SEARCH WORD AND RANGE FROM SEARCH WORD (3) ADD LOCATION IDENTIFICATION INFORMATION
LOCATION OF TABLE, ARRANGEMENT POSITION IN TABLE, AND THE LIKE

FIG.3

INFORMATION PROCESSING APPARATUS EQUIPPED WITH FUNCTION OF ADDING NEW CONTENT TO ORIGINAL FILE AND OUTPUTTING FILE

INCORPORATION BY REFERENCE

This application is based on and claims the benefit of priority from Japanese Patent Application No. 2018-174761 filed on Sep. 19, 2018, the contents of which are hereby incorporated by reference.

BACKGROUND

The present disclosure relates to an information processing apparatus that is equipped with a function of adding new content to an original file, and outputting the file.

An apparatus that is capable of generating one file that is based on a plurality files and outputting (transmitting, printing, or the like) the file is known. For example, an apparatus that attaches an image of another image file to a certain one document file before outputting the file is known. For example, in first typical technology, there is an apparatus that attaches image data of a seal (approval seal or the like) to a specified location in a document file, and outputs the file as a new document file. When performing this work, approval of a manager of the seal is required, however, in the first typical technology, configuration is such that this approval is suitably performed.

In the first typical technology, the main body of the document file that is finally outputted is just the original document file, and after image data of the seal is attached to this original document file, the file is taken to be the final document file. On the other hand, in second typical technology, there is an apparatus that combines a plurality of document files to obtain a new document file, and outputs this document file as one printing job.

With this technology, a user does not perform work of creating a document file to be finally outputted, but rather the document file to finally be outputted is automatically created on the apparatus side from a prepared plurality of files and then can be outputted. As a result, the burden on the user may be reduced. Particularly, when the location where a seal is inserted in a document file in the first typical technology, or when the format of combining a plurality of document files in the second typical technology is determined in advance, the work of creating a new document file is easy, so particularly efficient processing may be performed.

SUMMARY

The information processing apparatus according to the present disclosure generates an output target file by performing an addition or change of content to a specified original file, and outputs that output target file. The information processing apparatus is equipped with a storage unit and a control unit. The storage unit correlates additional content identification information for identifying additional content that is content added to the original file or content after change; additional content manager information for identifying a manager of the additional content; and add location identification information for identifying a location where the additional content is to be provided in the original file with the additional content and stores the information. The control unit provides the additional content that is extracted from a file other than the original file based on the additional content identification information, or that is acquired from the manager based on the additional content manager information to the original file based on the add location identification information, and causes the file to be outputted as the output target file.

BRIEF DESCRIPTION OF THE DRAWINGS

FIG. 2 is an example of the content of an original file (document file) specified by an information processing apparatus of an embodiment according to the present disclosure.

FIG. 3 is an example of the content of additional content manager information, additional content identification information, and add location identification information that is used by an information processing apparatus of an embodiment according to the present disclosure.

DETAILED DESCRIPTION

Figure 1:
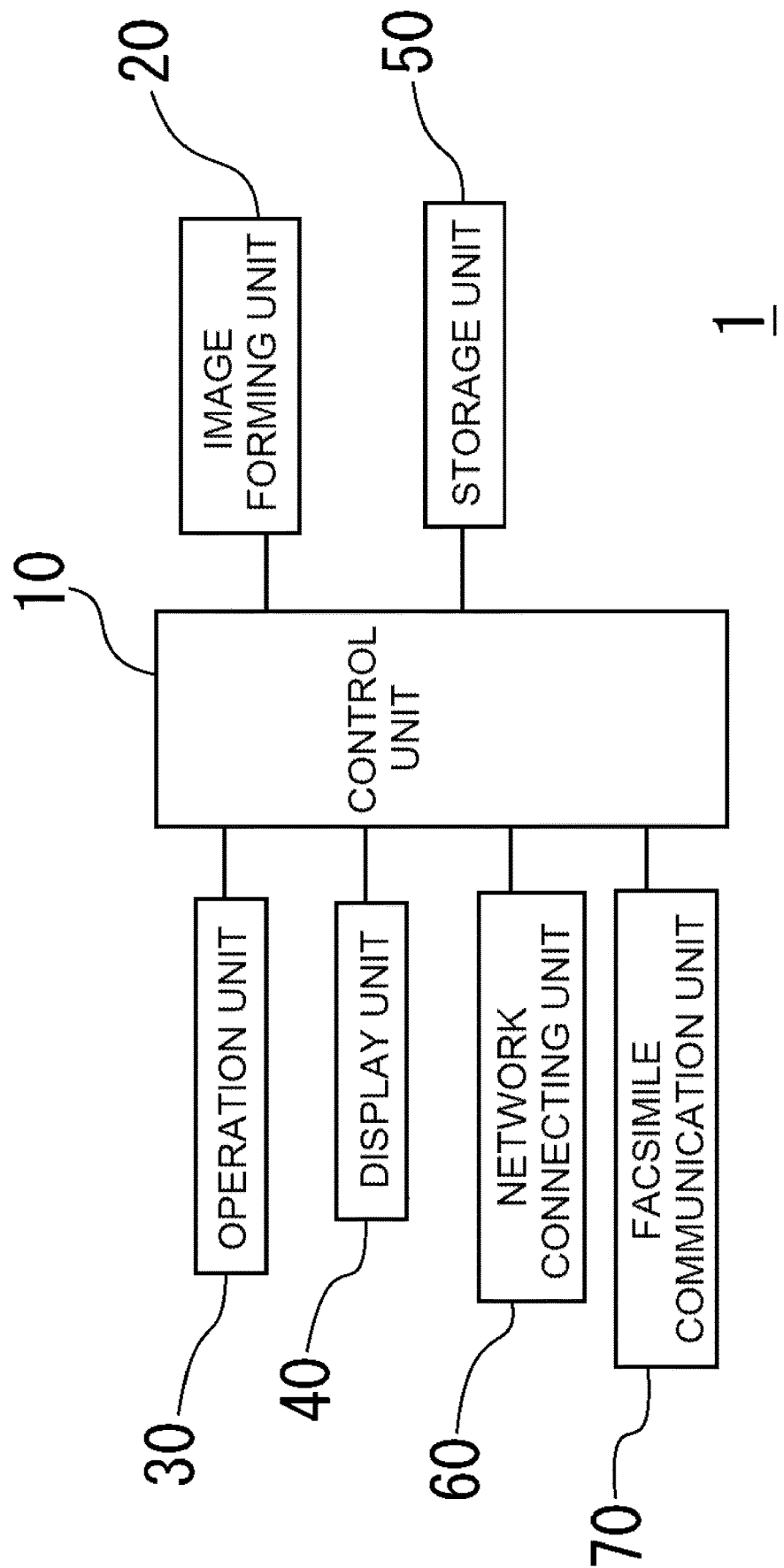
FIG. 1 is a block diagram illustrating the configuration of an information processing apparatus of an embodiment according to the present disclosure.

Hereinafter, an information processing apparatus of an embodiment according to the present disclosure will be explained. FIG. 1 is a diagram illustrating the configuration of this information processing apparatus 1. This image processing apparatus 1 is an MFP (image forming apparatus), and may perform a printout, facsimile transmission via a facsimile line, e-mail transmission via a network, SMB transmission or the like on a file (document file or the like) that is targeted for output.

In FIG. 1, an image forming unit 20 is provided in order to execute a printing function for forming an image on paper (medium) and outputting the paper. The configuration of the image forming unit 20 is no different, for example, from a normal laser printer or the like. In addition, an operation unit 30 and a display unit 40 are provided. The operation unit 30 is provided with operation keys for the user to operate this MFP 1. The display unit 40 is equipped with a display on which various information is displayed at this time. Moreover, a storage unit 50 configured of a hard disk or non-volatile memory for storing various data handled by this MFP 1 is provided. Furthermore, a network connecting unit 60 and a facsimile communication unit 70 are also provided. The network connecting unit 60, by connecting with a network, becomes an interface for receiving printing jobs, transmitting e-mail, performing SMB transmission and the like. The facsimile communication unit 70 performs facsimile transmission and reception via a facsimile line (telephone line). In addition, a control unit 10 equipped with a CPU for controlling all of the components described above so as to perform desired operations is also provided.

This MFP 1 may create a new file (output target file) by inserting content that is included in another file, or content that is entered by another user, or the like at a specified location of a specified file (original file). After that, for this new file, the MFP 1 may perform a process such as a printout by the image forming unit 20, transmission of a facsimile via the facsimile communication unit 70, transmission of e-mail or SMB transmission via the network connecting unit 60, or the like.

Particularly, this MFP 1 has a feature of an operation of generating an output target file from an original file as described above. This operation will be described below. This operation is performed by the control unit 10.

FIG. 2 illustrates an example of content of an original file (document file) that will be the target here. This original file is a document file and is stored in the storage unit 50. In this original file, a table is inserted between text information, and items in this table are blank. An output target file is created by filling in the blank items, and this file is newly stored in the storage unit 50. The user may confirm the contents on the display unit 40, or on a display of a computer that is connected via the MFP 1 and a network.

Here, A1 to A3 (items with hatching) in the table in FIG. 2 are blank, and the other items in the table (three items in the second row from the top, and three items in the third row from the top) are filled in. Therefore, information is used for identifying what content (additional content) is to be added to which location in the table in FIG. 2 (add location: one of A1 to A3). At this time, a manager that manages the additional content is also set, for example, there are also cases in which different managers respectively set additional content to different add locations. After the user creates this information, the information is stored in the storage unit 50, and the control unit 10 uses the information to create an output target file after the additional content has been added. Hereinafter, a case will be described in which A1 is the add location, however, the same is true for A2 and A3.

FIG. 3 illustrates detailed contents of this information. Here, (1) additional content manager information is an item for identifying a manager that bears the responsibility for the additional content of A1, and here, the e-mail address or the like of the manager is entered.

Moreover, (2) additional content identification information is information that is set for identifying additional content. Here, it is presumed that additional content is provided in part of a file (specified file) other than the original file described above. First, in (2-1), the folder name where this specified file is stored is specified. Here, not only a folder in the storage unit 50, but also a folder that can be read via a network may also be a target. In other words, a file that is stored in an arbitrary device may be used as this specified file as long as the file may be read from the information processing apparatus 1. Next, as (2-2a) a file name of a file (specified file) that stores the content to be added is set. Alternatively, instead of a specific file name, an identifier of the specified file may be set in (2-2b).

Next, information for identifying which content in the specified file is to be inserted in A1 is inputted. Here, as (2-3a) the specification of the location where the additional content is provided, this content is identified, for example, by the page and line or the like where the content to be added is provided. Alternatively, instead of this, the additional content may be identified using a search word in (2-3b). In this case, when there is an article having a heading "related to A1" provided in the specified file, for example, the search word is "related to A1". As a result, the content of the article after the heading "related to A1" may be specified as content to be inserted in A1. In that case, for example, content provided in a fixed range (for example 1 line) after the heading "related to A1" may be identified as this additional content.

As (3) add location identification information, information for identifying the add location (A1 to A3) in the original file is provided. The provided information, when in a sentence, may for example specify the page, line and the number of the characters from the left, or the like. Moreover, in the case of the table illustrated in FIG. 2, this may be specified as a page in the table, column, line (in the case of A1, the second column and the second line in the table). The add location identification information differs for the add locations A1 to A3 described above.

In the example described above, a plurality of different files are each taken to be an original file, and in a case where the same additional content manager information, additional content identification information and add location identification information may be used for each original file, such a plurality of files may be specified as the original file. This, in other words, is a case in which the same content is added to the same location in each original file.

In addition, in this MFP 1, a desired output is performed on a file (output target file) after all of the additional content has been added such as described above to the add locations A1 to A3 described above. Therefore, the output information in which this output content is provided is also created by the user. As this output, one can be selected from (A) a printout by the image forming unit 20 in FIG. 1, (B) facsimile output using the facsimile communication unit 70, (C) e-mail transmission via the network connecting unit 60, and (D) SMB transmission via the network connecting unit 60. Which one of these to select is created by the user as output information together with the information described above. When doing this, commands corresponding to (A) to (D) are set in advance, for example, and by providing a command in the output information, the command can be recognized by the control unit 10.

In this output information, in the case where (A) printout is selected, settings for various parameters for the printout (paper, color setting, single-sided printing/double-sided printing, and the like) are also provided at the same time in the output information. Similarly, when (B) facsimile output is selected, the line number of the facsimile transmission destination is similarly provided in the output information, when (C) e-mail transmission is selected, the e-mail address of the transmission destination is similarly provided in the output information, and when (D) SMB transmission is selected, the folder specification of the transmission is similarly provided in the output information.

Figure 4:
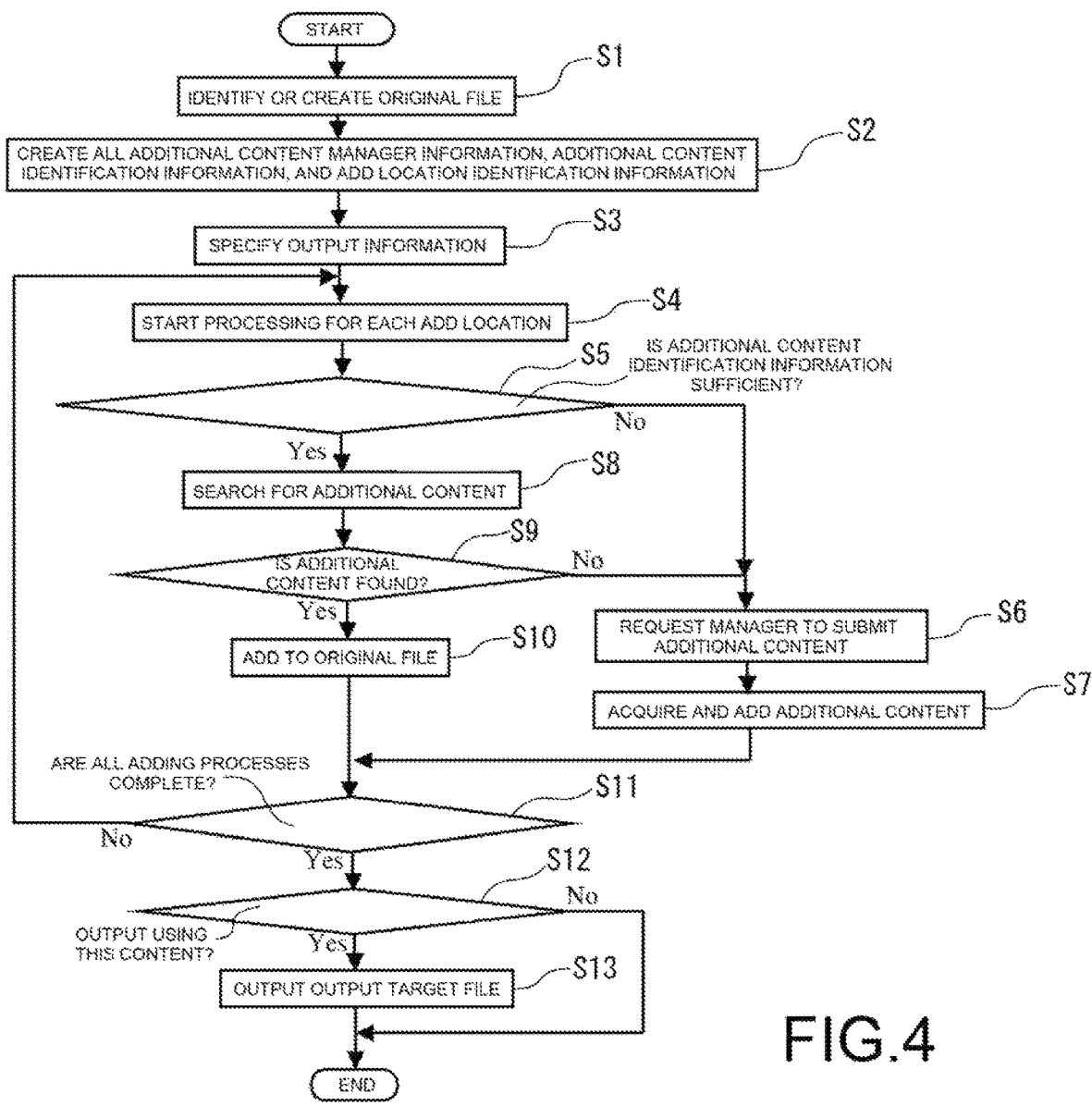
FIG. 4 is a flowchart illustrating operation by the information processing apparatus of an embodiment according to the present disclosure.

Hereinafter, the operation of generating an output target file from the original file as described above, and outputting that file will be described in detail. FIG. 4 is a flowchart illustrating the operation of the control unit 10 during this time. First, the control unit 10 uses the operation unit 30 and the display unit 40 and causes the user to identify or create an original file (S1). Next, the control unit 10 causes the user to create information for identifying the manager of the additional content, and the additional content, and to create a specification for the add location in the original file (for example, A1 to A3 in FIG. 2) as the additional content manager information, additional content identification information, and add location identification information such as described above. Then, the control unit 10 stores that information in the storage unit 50 (S2). At this time, instead of directly causing the user to create this information, the control unit 10 may create this information by using the display unit 40 and operation unit 30 to cause the user to perform input in an interactive form. The information is created for each location that requires information to be inserted, and a plurality of information is set according to the add location (additional item).

Similarly, the control unit 10 causes the user to create output information, and store that information in the storage unit 50 (S3). The output information is created in a one-to-one correspondence with the original file, and similar to as described above, the control unit 10 may create output information in an interactive form. Incidentally, as described above, the operation above (S1 to S3) is performed for one original file, however, in a case where the same additional content manager information, additional content identification information, add location identification information, and output information may be applied, a plurality of original files may be selected at the same time (S1). At this time, output information is set for each original file, however, the output information may be common for all of the original files.

After that, processing is performed for each add location (S4). Here, first, whether or not this additional content identification information is sufficient for identifying the additional content is checked (S5). For example, in the example in FIG. 3, a case in which (2-1) folder specification is provided, and further (2-2a) file name or (2-2b) file extension is provided, and further (2-3a) additional content location specification or (2-3b) search word and range are specified will be described. In this case, the additional content identification information is confirmed as being sufficient for identifying this additional content (S5: YES).

In a case where the additional content identification information is not sufficient for identifying this additional content because one of the items above is blank (S5: NO), the control unit 10 is not able to find the additional content. Therefore, in this case, the control unit 10 references the manager in (1) additional content manager information, and together with contacting this manager by e-mail about this, sends the original file, and request that the specified additional content be submitted (S6). After that, the control unit 10 receives the desired additional content from this manager side by e-mail, and adds this to the original file (S7). Alternatively, a setting may be performed so that a file for which adding the additional content to the original file is performed is received from this manager.

In a case where it recognized that the additional content identification information is sufficient for identifying this additional content (S5: YES), the control unit 10 searches for the additional content from the conditions given by the additional content identification information (S8). When the additional content is found (S9: YES), this additional content is added to the specified add location in the original file (S10). On the other hand, when the additional content cannot be found by a search (S9: NO), similar to the case when the additional content identification information is not sufficient (S5: NO), a request to the manager to submit the additional content (S6), and acquisition of the additional content (S7) is performed.

Here, when the manager is requested to submit additional content (S6) and the manager determines that this content is not necessary, the control unit 10 may leave the additional content blank (Null) without adding the content. In this case, after this, an output target file is created in a state of this additional content being blank. Moreover, in a case where additional content cannot be received (S7) within a preset specified amount of time after the request (S6) to the manager, the request (S6) may performed again, or this additional content may be blank.

Furthermore, even when the additional content identification information is sufficient (S5: YES) and the control unit 10 finds the additional content (S9: YES), this content may be transmitted to the manager, and after being confirmed, may be set to be used. In this case, as in the case described above where the manager creates additional content and performs the adding of the content (S6, S7), the manager may perform work such as correcting this additional content, or leaving this additional content blank again, or the like. As a result, it is possible to perform an addition of content that further reflects the intention of the manager.

The process described above is performed for all of the additional items, or in other words is performed for all of the adding processes. After all of the adding processes are complete (S11: YES), the control unit 10 causes the added portion or the output target file to be displayed by the display unit 40, and then inquires of the user whether to output this content (S12). The user performs this answer via the operation unit 30, and when the user desires the content to be outputted, this output is performed (S13).

With the operation described above, it is possible to combine a plurality of additional items in various forms and then output it. At this time, together with the control unit 10 being able to automatically find the additional contents, a manager is set for each additional item, so it becomes possible to set various correspondence, for example a setting so that adding items is not performed. Therefore, it is possible to always perform suitable addition of items.

Incidentally, in the example described above, output information is set (S3), and an output target file for which all additions have been performed is set (S11: YES), after which output is performed based on the output information (S13). In the example described above, this information processing apparatus 1 is an image forming apparatus (MFP) equipped with the configuration illustrated in FIG. 1, and in order to provide various output functions, it is effective to perform output using output information in this way. However, it is also possible to only create the same output target file, and to perform only a process of storing this file in the storage unit 50 without performing output. In this case, it is possible to use a typical computer or the like that is not equipped with a printing function or a facsimile communication function as the information processing apparatus described above. In this case, creation (S3) of the output information described above is also not necessary, and after the output target file is stored in the storage unit 50, the user can perform output of that file in various forms.

Moreover, in the example described above, the acquired additional content is presumed to be added to add locations specified as blanks as illustrated in FIG. 2. However, instead of adding the additional content to a location that is blank, it is possible to perform a setting such that a location that is provided with an item beforehand is partially changed. In this case, for example, in the flowchart in FIG. 4, instead of making the additional content blank as described above, the original item can be used without changing.

In addition, in the flowchart in FIG. 4, when performing a determination as to whether or not additional content is received (S7) within a preset specified amount of time after a request (S6) to the manager, a setting may be performed so that it is possible to change (extend) this specified time from the manager side. At this time, when there is additional content and there is a plurality of managers corresponding to that content, and that change is performed by one manager of the plurality of managers, the control unit 10 preferably contacts all of the other manager for notifying of that. In this case, a setting is performed so that additional content corresponding to a manager that does not respond after the new specified time has elapsed is not used, and this add location is left as a blank or with the original provided item. Then, a setting can be performed so that only additional content corresponding to a manager that responds is reflected, or only an instruction (for example addition is unnecessary) from a manager that responds is reflected.

Note that, in the example described above it is presumed that the information processing apparatus 1 is a single apparatus (image forming apparatus) that is equipped with the configuration in FIG. 1, however, it is not necessary that a single apparatus equipped with this configuration be used, and it is also possible to realize the same configuration via a network for example. For example, this information processing apparatus can be realized by using an image forming apparatus equipped with an image forming unit, and a computer that is connected with this image forming apparatus via a network that is equipped with an operation unit, a display unit and a control unit that are used for direct operation by a user. The storage unit 50 in FIG. 1, or a device that stores a specified file in which additional content is provided are also arbitrary as long as these units can be recognized from the control unit.

Actually there are various forms as the form for creating a new file by combining a plurality of files. For example, there may be a case in which there is a table in one document file that is created by a user, and parts of other document files by a plurality of other users are to be inserted afterwards as items in this table. In this kind of case, the user that created the original document file is not able to estimate the content that is to be inserted afterwards, so in the case of using the typical technology described above, it is difficult to perform suitable processing. In addition, in some cases it may be necessary to perform output in a state in which writing cannot be performed to a desired item depending on the case, and in such a case, the process cannot proceed.

Therefore, an information processing apparatus capable of combining and outputting the addition of a plurality of items in a original file in various forms is preferred.

With the configuration according to the disclosure described above, it is possible to obtain an information processing apparatus capable of combining and outputting the addition of a plurality of items in a original file in various forms.

What is claimed is:

1. An information processing apparatus that generates an output target file by performing an addition or change of content to an original file specified by a user, and outputs the output target file, the information processing apparatus comprising:

a control unit that causes the user to specify a manager of additional content that is content added to the original file or content after being changed, and when there is no response from the manager within a preset specified amount of time after performing a request to the manager to submit the additional content, contacts the manager again;

wherein a plurality of additional content and a plurality of managers are set;

the specified amount of time can be changed by one of the managers;

the control unit notifies the managers other than the one manager of the changed specified amount of time; and when there is a manger that has not responded after the specified amount of time has elapsed after a change, the control unit causes the output target file to be outputted without adding or changing content that uses the additional content corresponding to the manager.

2. The information processing apparatus according to claim 1 wherein after the contact again, when a notification is received notifying that the manager has determined that providing the additional content is unnecessary, the control unit causes the output target file to be outputted without adding or changing content that uses the additional content.

* * * * *